US010062096B2

(12) United States Patent
Mello

(10) Patent No.: US 10,062,096 B2
(45) Date of Patent: Aug. 28, 2018

(54) SYSTEM AND METHOD FOR LISTING ITEMS FOR PURCHASE BASED ON REVENUE PER IMPRESSIONS

(71) Applicant: Vegas.com, LLC, Henderson, NV (US)

(72) Inventor: Paul Leslie Mello, Henderson, NV (US)

(73) Assignee: Vegas.com, LLC, Henderson, NV (US)

( * ) Notice: Subject to any disclaimer, the term of this patent is extended or adjusted under 35 U.S.C. 154(b) by 938 days.

(21) Appl. No.: 13/782,415

(22) Filed: Mar. 1, 2013

(65) Prior Publication Data

US 2014/0249960 A1 Sep. 4, 2014

(51) Int. Cl.
 *G06Q 30/06* (2012.01)

(52) U.S. Cl.
 CPC ................ *G06Q 30/0623* (2013.01)

(58) Field of Classification Search
 CPC ........... G06Q 30/0601; G06Q 30/0206; G06Q 30/06–30/08
 USPC ............................................. 705/26.1–27.2
 See application file for complete search history.

(56) References Cited

U.S. PATENT DOCUMENTS

| | | | |
|---|---|---|---|
| 4,912,310 A | 3/1990 | Uemura et al. |
| 5,867,588 A | 2/1999 | Marquardt |
| 5,899,980 A | 5/1999 | Wilf et al. |
| 5,970,469 A | 10/1999 | Scroggie et al. |
| 6,408,281 B1 | 6/2002 | Shell et al. |
| 6,629,591 B1 | 10/2003 | Griswold et al. |
| 6,775,371 B2 | 8/2004 | Elsey et al. |
| 6,824,066 B2 | 11/2004 | Weyant |
| 6,876,979 B2 | 4/2005 | Ling |
| 7,032,817 B2 | 4/2006 | Blank |
| 7,127,236 B2 | 10/2006 | Khan et al. |
| 7,174,029 B2 | 2/2007 | Agostinelli et al. |
| 7,174,563 B1 | 2/2007 | Brownlie et al. |
| 7,239,226 B2 | 7/2007 | Berardi et al. |
| 7,296,282 B1 | 11/2007 | Koplar et al. |
| 7,315,823 B2 | 1/2008 | Bröndrup |
| 7,398,225 B2 | 7/2008 | Voltmer et al. |
| 7,636,674 B2 | 12/2009 | Francis |
| 7,703,673 B2 | 4/2010 | Buchheit et al. |
| 7,815,506 B2 | 10/2010 | Franklin et al. |
| 8,020,181 B2 | 9/2011 | Koplar et al. |
| 8,052,518 B1 | 11/2011 | Kelly et al. |

(Continued)

FOREIGN PATENT DOCUMENTS

CN 102760144 A 10/2012

OTHER PUBLICATIONS

Non-Final Office Action for U.S. Appl. No. 13/365,110, filed Feb. 2, 2012, and mailed from the USPTO dated Jul. 31, 2014, 17 pgs.

(Continued)

*Primary Examiner* — Ming Shui
(74) *Attorney, Agent, or Firm* — Stoel Rives, LLP

(57) ABSTRACT

A computer-enabled transaction system provides a list of items for purchase in response to a user request for an item. The system filters prospective items based on eligibility which includes availability of the item for purchase. Eligible items are ranked based on generated revenue per impressions wherein impressions include previous viewings of the items. The ranked, eligible items are then displayed in a list to the user with preferential displaying of the higher ranked items.

18 Claims, 6 Drawing Sheets

(56) References Cited

U.S. PATENT DOCUMENTS

| | | |
|---|---|---|
| 8,239,487 B1 | 8/2012 | Hoffman et al. |
| 2002/0082076 A1 | 6/2002 | Roser et al. |
| 2002/0112174 A1 | 8/2002 | Yager et al. |
| 2002/0131565 A1 | 9/2002 | Scheuring et al. |
| 2002/0151359 A1 | 10/2002 | Rowe |
| 2003/0126013 A1 | 7/2003 | Shand |
| 2003/0217002 A1 | 11/2003 | Enborg |
| 2004/0044571 A1* | 3/2004 | Bronnimann ......... G06Q 30/02 705/14.71 |
| 2004/0167794 A1 | 8/2004 | Shostack et al. |
| 2005/0049731 A1 | 3/2005 | Dell |
| 2005/0080748 A1 | 4/2005 | Belobaba et al. |
| 2005/0176507 A1 | 8/2005 | Ephrati et al. |
| 2005/0284930 A1 | 12/2005 | Hefner et al. |
| 2006/0015404 A1 | 1/2006 | Tran |
| 2006/0063587 A1 | 3/2006 | Manzo |
| 2006/0136344 A1* | 6/2006 | Jones ............... G06Q 30/06 705/402 |
| 2006/0148567 A1 | 7/2006 | Kellerman et al. |
| 2006/0179045 A1* | 8/2006 | Grinsfelder ......... G06Q 30/02 |
| 2006/0195331 A1 | 8/2006 | Goldthwaite et al. |
| 2006/0277103 A1 | 12/2006 | Fujita et al. |
| 2006/0287898 A1 | 12/2006 | Murashita et al. |
| 2007/0055440 A1 | 3/2007 | Denker et al. |
| 2007/0143155 A1 | 6/2007 | Whitsett et al. |
| 2007/0173326 A1 | 7/2007 | Jennings et al. |
| 2007/0259709 A1 | 11/2007 | Kelly et al. |
| 2007/0265920 A1 | 11/2007 | Bistriceanu et al. |
| 2008/0040239 A1 | 2/2008 | Jacobi et al. |
| 2008/0091482 A1 | 4/2008 | Whitsett et al. |
| 2008/0224822 A1 | 9/2008 | Gelman et al. |
| 2008/0254893 A1 | 10/2008 | Patel et al. |
| 2008/0262862 A1 | 10/2008 | Chatenay |
| 2008/0274796 A1 | 11/2008 | Lube |
| 2008/0300990 A1 | 12/2008 | Guiton et al. |
| 2008/0306826 A1 | 12/2008 | Kramer et al. |
| 2008/0311893 A1 | 12/2008 | Liu et al. |
| 2009/0063206 A1* | 3/2009 | Payne ............... G06Q 30/0601 705/5 |
| 2009/0131143 A1 | 5/2009 | Kelly et al. |
| 2009/0156310 A1 | 6/2009 | Fargo |
| 2009/0171988 A1 | 7/2009 | Kikin-Gil |
| 2009/0177541 A1 | 7/2009 | Martel et al. |
| 2009/0216633 A1 | 8/2009 | Whitsett et al. |
| 2009/0276292 A1 | 11/2009 | Inselberg |
| 2009/0287570 A1 | 11/2009 | Adamousky et al. |
| 2009/0292599 A1 | 11/2009 | Rampell et al. |
| 2009/0313094 A1 | 12/2009 | Singh |
| 2010/0018046 A1 | 1/2010 | Pöllabauer |
| 2010/0030578 A1 | 2/2010 | Siddique et al. |
| 2010/0076862 A1 | 3/2010 | Lefkowitz |
| 2010/0078475 A1 | 4/2010 | Lin et al. |
| 2010/0082481 A1 | 4/2010 | Lin et al. |
| 2010/0099485 A1 | 4/2010 | Sommer et al. |
| 2010/0169188 A1 | 7/2010 | Buchheit et al. |
| 2010/0179879 A1 | 7/2010 | Cunningham et al. |
| 2010/0191582 A1* | 7/2010 | Dicker ............... G06Q 30/02 705/14.51 |
| 2010/0250290 A1 | 9/2010 | Lefkowitz |
| 2010/0260426 A1 | 10/2010 | Huang et al. |
| 2010/0293034 A1* | 11/2010 | Olejniczak ......... G06F 17/30864 705/14.45 |
| 2011/0003634 A1 | 1/2011 | Manteris |
| 2011/0183762 A1 | 7/2011 | Topham et al. |
| 2011/0238503 A1 | 9/2011 | Naini |
| 2011/0263318 A1 | 10/2011 | Agarwal et al. |
| 2011/0264474 A1 | 10/2011 | Lefkowitz |
| 2011/0295693 A1 | 12/2011 | Clavin et al. |
| 2012/0088570 A1 | 4/2012 | Schwartz |
| 2012/0089581 A1 | 4/2012 | Gupta et al. |
| 2012/0185310 A1 | 7/2012 | Greenspun |
| 2012/0197692 A1 | 8/2012 | Ganz et al. |
| 2012/0270645 A1 | 10/2012 | Bortnik et al. |
| 2013/0031104 A1* | 1/2013 | Gopinath ......... G06F 17/30867 707/748 |
| 2013/0080257 A1 | 3/2013 | Greenspun |

OTHER PUBLICATIONS

Office Action Summary from USPTO for U.S. Appl. No. 13/365,110 dated May 31, 2013.
Notice of Allowance from USPTO for U.S. Appl. No. 13/007,959 dated May 14, 2013.
Non-Final Office Action for U.S. Appl. No. 13/681,142, filed Nov. 19, 2012, and mailed from the USPTO dated Nov. 14, 2013, 18 pgs.
Final Office Action for U.S. Appl. No. 13/681,142, filed Nov. 19, 2012, and mailed from the USPTO dated Jun. 19, 2013, 26 pgs.
Final Office Action for U.S. Appl. No. 13/365,110, filed Feb. 2, 2012, and mailed from the USPTO dated Sep. 12, 2013, 35 pgs.
Notice of Allowance and Fee(s) Due for U.S. Appl. No. 13/365,110, filed Feb. 2, 2012, and mailed from the USPTO dated Dec. 31, 2014, 25 pgs.
Article entitled "Increase Web Sales: Convert Facebook Fans Into Customers," by Carrieanne Larmore, web page at http:www.suite101.com.content/e-commerce-strategies-convert-facebook-fans-into-cuto . . . , as available via the Internet and printed Jan. 3, 2011 (15 pgs.).
Office Action for U.S. Appl. No. 12/208,236, filed Sep. 10, 2008 and mailed from the USPTO dated Aug. 8, 2011.
Office Action for U.S. Appl. No. 12/413,321, filed Mar. 27, 2009, and mailed from the USPTO dated Oct. 3, 2011, 28 pgs.
Office Action for U.S. Appl. No. 13/178,997, filed Jul. 8, 2011, and mailed from the USPTO dated Dec. 14, 2011.
Office Action for U.S. Appl. No. 13/007,959, filed Jan. 17, 2011, and mailed from the USPTO dated Nov. 9, 2012.
Office Action for U.S. Appl. No. 13/681,142, filed Nov. 19, 2012, dated Jan. 22, 2013.

* cited by examiner

Toys

Purchase Date
12/07/2012

Purchase Date
12/08/2012

Toy Number
1 ▼

Select a Toy
All Toys ▼

---

Select a Toy

Get Gifts Now! Toys sell out quickly.
Some Retails Charge Additional Costs
1-25 of 80 results Sort by:  ● Picks   ○ Price   ○ Location   ○ Star Rating

---

*LeapPad 2*
☆☆☆☆ 81% Recommend This Show   Audience Rating  4/5
Toy Type
VIP Model                                                   $ 130.00
Standard Model                                              $ 80.00

*Furby*
☆☆☆☆  78% Recommend This Show   Audience Rating  4/5
Toy Type
Standard Model                                              $ 70.00

*Nintento Wii*
☆☆☆☆  71% Recommend This Show   Audience Rating  4/5
Toy Type
Standard Model                                              $130.00

*Kindle Fire*
☆☆☆  86% Recommend This Show  Audience Rating  4/5
Toy Type
Standard Model                                              $200.00

*Nanoblocks*
☆☆☆  88%  Recommend This Show Audience Rating  4/5
Toy Type
Standard Model                                              $ 113.00

FIG. 4

Video Games

| Purchase Date |
| 12/07/2012 |

| Purchase Date |
| 12/08/2012 |

Game Number
| 1 ▼ |

Select a Game
| All Games ▼ |

Select a Game

Get Your Games Now! Games sell out quickly.
Some stores charge additional fees.
1-25 of 80 results Sort by:  ● Picks    ○ Price    ○ Location    ○ Star Rating

*Halo 4*
☆☆☆☆ 81% Recommend This Game   Audience Rating   4/5
Game Type
Basic Version                                          $ 60.00

*Grand Theft Auto 5*
☆☆☆ 78% Recommend This Show   Audience Rating   4/5
Game Type
Basic Version                                          $ 65.00

*Call of Duty*
☆☆☆☆ 71% Recommend This Show   Audience Rating   4/5
Game Type
Basic Version                                          $ 70.00

*Metal Gear*
☆☆☆☆ 86% Recommend This Show   Audience Rating   4/5
Game Type
Basic Version                                          $ 60.00

*Guitar Hero 3*
☆☆☆ 88% Recommend This Show Audience Rating   4/5
Game Type
Basic Version                                          $ 85.00

FIG. 5

Concert Tickets

Ticket Date
12/07/2012

Ticket Date
12/08/2012

Ticket Number
1 ▼

Ticket Holder
Adults
2 ▼

Children
2 ▼

Select a Show
All Shows ▼

Select an Artist

Get Your Tickets Now! Concerts Sell Out Quickly.
Some concerts charge additional fees (Learn more)
1-25 of 80 results
Sort by:  ● Picks    ○ Price   ○ Venue   ○ Star Rating

*Ka*
☆☆☆☆ 81% Recommend This Show   Audience Rating   4/5
Ticket Type
VIP Section                                                              $ 300.00
Standard Seat                                                         $ 150.00

*Mystere*
☆☆☆☆ 78% Recommend This Show   Audience Rating   4/5
Ticket Type
Standard Seat                                                         $ 140.00

*O*
☆☆☆☆ 71% Recommend This Show   Audience Rating   4/5
Ticket Type
VIP Section                                                              $225.00

*Zumanity*
☆☆☆☆ 86% Recommend This Show   Audience Rating   4/5
Ticket Type
VIP Section                                                              $200.00

*Chris Angel*
☆☆☆☆ 88% Recommend This Show  Audience Rating   4/5
Ticket Type
Standard Seat                                                         $ 85.00

FIG. 6

SYSTEM AND METHOD FOR LISTING ITEMS FOR PURCHASE BASED ON REVENUE PER IMPRESSIONS

TECHNICAL FIELD

This disclosure relates to a system and method for selling products and services in an on-line environment and providing preferential listing of the products and/or services.

BRIEF DESCRIPTION OF THE DRAWINGS

Additional aspects and advantages will be apparent from the following detailed description of preferred embodiments, which proceeds with reference to the accompanying drawings, in which:

FIG. 4 is one embodiment of a webpage displaying a ranked list of video games for purchase in response to a user request;

FIG. 5 is one embodiment of a webpage displaying a ranked list of toy products for purchase in response to a user request; and FIG. 6 is one embodiment of a webpage displaying a ranked list of live shows for purchase on a requested date.

DETAILED DESCRIPTION OF PREFERRED EMBODIMENTS

Figure 1:
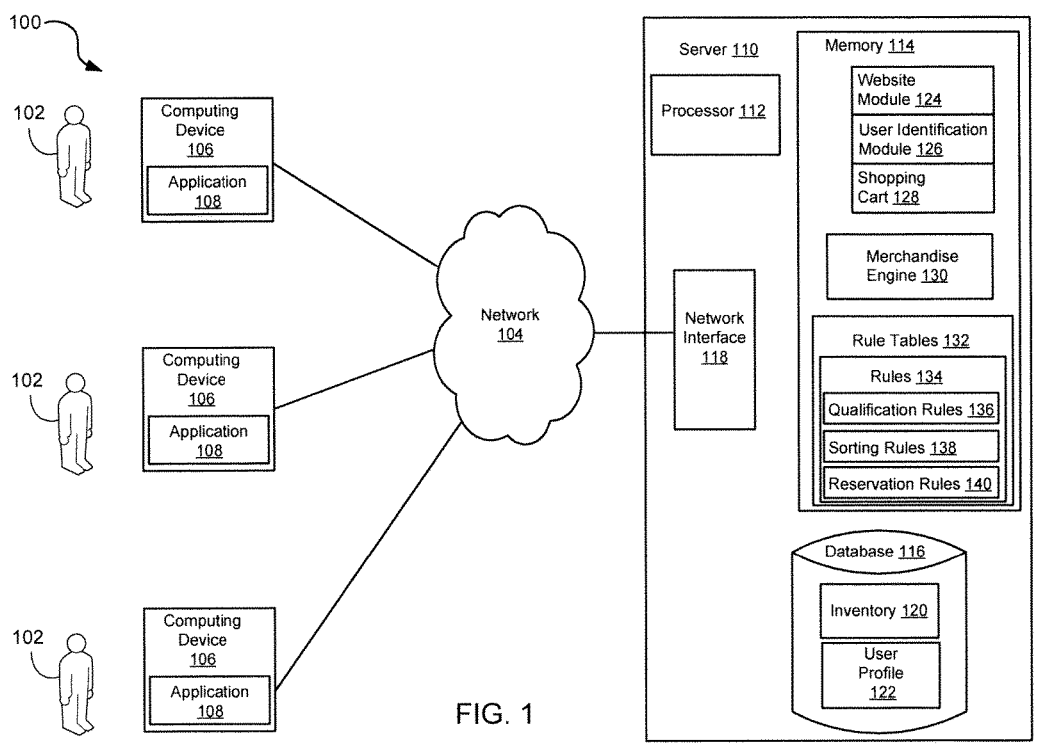
FIG. 1 is a block diagram of one embodiment of a system for providing and displaying items for purchase.

The disclosed systems and methods provide an on-line computer transaction system that allows customers to view available items for purchase based on generated revenue. In the following description, numerous details are provided to give a thorough understanding of embodiments. One skilled in the relevant art will recognize, however, that the embodiments can be practiced without one or more of the specific details, or with other methods. In other instances, well-known techniques and/or operations are not shown or described in detail to avoid obscuring innovative aspects of this disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer-readable medium), a method, and a product of a process.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable non-transitory and tangible medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing computer readable electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementation is readily provided by those of skill in the pertinent art(s) using the teachings presented here and programming languages and tools, such as Java, Pascal, C++, C, XML, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Much of the infrastructure that can be used is already available, such as: general purpose computers; computer programming tools and techniques; computer networks and networking technologies; digital storage media; authentication, access control, and other security tools and techniques provided by public keys, encryption, firewalls, and/or other means; bank transfers, credit card processing, digital money, and other tools and techniques for making payments.

For convenience, reference is also made to users and customers which are "human parties" or "humans" to distinguish them from computer and software operations. Operation of a computer and software may be overseen by human administrators and driven by data and/or commands from human users.

The described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Referring to FIG. 1, a block diagram is shown of one embodiment of a transaction system 100 for listing items for purchase for users or customers of a web service (e.g., website). The items may include products, such as tangible goods, or services, such as events. An event may be any activity contemplating the participation and personal attendance of a user 102. An event may not require an advance reservation, such as attending a theme park or museum, but may nevertheless require a ticket. In many, but not all, instances, event attendance may require a ticket and often such a ticket is obtained only by purchase. Some events are user-attended perishable events, wherein the event has an established date, time, and duration and, thus, can only be attended during that block of time. Any portion of the pre-established time during which the user is not attending the event perishes; the opportunity to attend that portion of the event has passed, and a corresponding portion of the purchase is wasted. Whether an event is perishable may be important for customers who prefer to not allow purchases to be wasted by passing unattended. Types of events may include, but are not limited to, accommodations, shows, sporting events, transportation, dining reservations, museums, tours, amusement parks, and other activities and attractions.

An accommodation event may include, but is not limited to, hotel rooms, apartment rentals, house rentals, timeshare rooms, houseboat rentals, and the like. Thus, the term accommodation includes a variety of embodiments where a customer may reside temporarily for travel. An accommodation event typically requires check-in and check-out dates, but the time of check-in and check-out is often flexible. An accommodation may also be available after the day of check-in, but a customer may have lost a portion of the event. Thus, the accommodation event may be considered perishable in that reserved days expire, and a customer/guest needs to be present on the reserved days in order to enjoy the accommodation. The accommodation may also be extended based on availability and at the discretion of the event provider.

A show event may refer to a theater show of many different varieties, including but not limited to a movie, ballet, opera, play, or a concert. A show may also refer to a show somewhere other than a theater, such as a stadium or an arena. Such shows may include, but are not limited to a circus, a fireworks display, or a show on ice A show event may include a specific date and time. The show event may also include one or more specific seats, or the show event may have open seating. As the show event occurs at a specific date and time, the show event is perishable in that the customer must be physically present at the date and time in order to enjoy the event.

A sporting event may include viewing of sporting events of many different varieties, including but not limited to a football game, baseball game, basketball game, hockey match, tennis match, motor cross, golf tournament, horse racing, and the like. A sporting event may include a specific date and time. The sporting event may also include one or more specific seats, or the sporting event may have open seating. As the sporting event occurs at a specific date and time, the sporting event is perishable in that the customer must be physically present at the date and time in order to enjoy the event.

A dining event may include, but is not limited to, a reservation at a restaurant. A dining reservation typically includes a specific date and time and is also perishable. If a customer arrives too late, the dining reservation may be cancelled, and lack of availability may preclude a customer from enjoying the dining event.

A transportation event may include, but is not limited to, airline reservations, bus tickets, train tickets, a cab ride, limousine rental, car rental, horse carriage ride, and the like. A transportation event that allows for an advanced reservation may generally be perishable in that such event requires meeting the carrier at a predetermined pick-up location at a pre-determined time. If the time for pick-up passes, the event perishes. Other transportation events may not be perishable, such as a pass to ride on a local bus system, subway, or other transit system, or a voucher for a cab ride from a particular company.

An activity event may require participation by the person attending the event and may or may not be a perishable event. Certain activities may be perishable based on the event and the event provider. For example, certain tours, skydiving, golf, river rafting, guided fishing trips, guided hunting expeditions, and the like may require specific dates and times in order to accommodate customers. Such events may be perishable. Other activity events may not require specific times and dates, such as amusement parks, water parks, theme parks, museums, ski resorts, summer resorts, zoological parks, state and national parks, water parks, and clubs. Such activity events may be open generally to the public and thus may not be perishable. Such events are not perishable if tickets to (or at least reservations to attend) the event may be usable at any time and on any date (or at least within a fairly wide range of dates) at the customer's convenience.

One or more users 102 may be communicatively coupled to a network 104. The users 102 may access the network 104 using respective internet capable computing devices 106, which may comprise any one of a variety of computing devices known in the art including, but not limited to: a personal computing device (e.g., a personal computer), a portable computing device (e.g., a laptop computer, a notebook computer, or the like), a smart phone (IPhone®, Android®, Blackberry®, or the like), a personal digital assistant (PDA), a set top box (STB), a multi-media appliance, or the like.

Each computer 106 may include a processor and a memory; computers may also include various input devices and/or output devices. The processor may include a special purpose processing device, such as an ASIC, PAL, PLA, PLD, Field Programmable Gate Array, or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. The computer 106 may include a computer-readable storage medium such as a magnetic, optical, solid-state, or other computer-readable storage device having a specific physical configuration. The physical configuration represents data and instructions which cause the computer system to operate in a specific and predefined manner as described herein. Thus, the medium tangibly embodies a program, functions, and/or instructions that are executable by computer(s) to reserve and purchase events as described herein.

Each of the computing devices 106 may comprise a respective web application 108 to access and display content accessible through the network 104. As used herein, a web application refers to any application or process used to access content on a network. Accordingly, a web application may refer to a web browser application, such as Microsoft Internet Explorer®, Mozilla Firefox®, Google Chrome®, Apple Safari®, or the like. A web application may further refer to any other type of application that, although not principally directed to accessing/displaying network content as a web browser, is capable of accessing and/or displaying content from a network. For example, a word processor may be a user agent in the sense that it provides network access features, such as an online help feature, access to online libraries (e.g., clip art libraries, etc.), and the like. Similarly, an online ordering/reservation application may act as a web application by interacting with network accessible storefront/reservation systems. An email client may be referred to as a web application in that it provides access to network data, such as email messages, network content referenced (e.g., linked) therein, and so on.

Web resource(s) and/or web services accessed by the application(s) 108 may comprise content formatted according to the HTML standard (or a related standard). The web resource(s) may be transmitted to the application 108 over the network 104 using the Hyper Text Transfer Protocol (HTTP) standard (or a related standard). However, although HTML content transferred via HTTP is discussed herein, the teachings of this disclosure should not be read as limited to any particular content format and/or communication protocol. As used herein, a web resource may refer to any content that is displayable by a user agent (e.g., content formatted according to the Hyper Text Markup Language (HTML)) standard, or a related standard) and/or a plug-in to the user agent (e.g., content that is displayable by a Flash® virtual machine, a Java® virtual machine, or the like). Accordingly, a web resource may comprise static and/or interactive (e.g., dynamic) text, imagery, audio, video, interface components (e.g., maps, configuration interfaces, etc.), games, editing tools, or the like. As used herein, a web service may refer to any service which is accessible via a network. Examples of web services include, but are not limited to a web site, a web server, an FTP service, a Telnet service, an online help application, an instant messaging service, an email server, a Simple Object Access Protocol (SOAP) service, a Web Service Description Language (WSDL) compliant service, or the like.

The network 104 may comprise any data communication network known in the art including, but not limited to: a transmission control protocol, Internet Protocol (TCP/IP) network, the Internet, a local area network (LAN), a wide area network (WAN), a virtual private network (VPN), a public switched telephone network (PSTN), a wireless network (e.g., IEEE 802.11a-g, Bluetooth, or the like), a combination of networks, or the like. Suitable networks for configuration and/or use as described here include one or more local area networks, wide area networks, metropolitan area networks, and/or "Internet" or IP networks, such as the World Wide Web, a private Internet, a secure Internet, a value-added network, a virtual private network, an extranet, or intranet. In particular, a suitable network may be formed from parts or entireties of two or more other networks, including networks using disparate hardware and network communication technologies. One suitable network includes at least one server and several clients; other suitable networks may contain other combinations of servers, clients, and/or peer-to-peer nodes, and a given computer may function both as a client and as a server. Each network includes at least two computers, such as a server and/or clients. A computer may be a workstation, laptop computer, disconnectable mobile computer, server, mainframe, cluster, so-called "network computer" or "thin client", personal digital assistant or other hand-held computing device, "smart" consumer electronics device or appliance, or a combination thereof.

The network 104 may include communications or networking software, such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

The computing devices 106 may access one or more servers 110 using the network 104. Each server 110 may comprise one or more computing devices and include one or more processors 112, memory 114, database 116, one or more network interfaces 118, input/output devices (not shown), and the like. One or more components of the server 110 may be configured to operate as a distributed server, virtual server, cloud based server, and/or a cluster server. The processor 112 may comprise any processing means known in the art, such as one or more Intel Core2 Duo® processors, one or more AMD Athlon® processors, and so on. Each of the one or more processors may comprise a plurality of processing cores. In some embodiments, the server 110 may comprise a plurality of processing modules (not shown), in a blade or similar configuration. Accordingly, as mentioned, the server 110 may comprise a plurality of computing devices (e.g., servers) operating in a cluster and/or load balancing configuration. The server 110 may be communicatively coupled to the network 104 using the network interface 118, which may comprise an Ethernet interface, a wireless communication interface, a PSTN interface, or the like.

The memory 114 may comprise any volatile and/or non-volatile memory known in the art. The computer-readable non-transitory storage media may comprise one or more discs (e.g., magnetic discs), optical media, distributed media (e.g., in a storage area network (SAN) or the like), or similar devices. The input/output devices may comprise one or more keyboards (not shown), pointing devices (not shown) (e.g., a mouse, track ball, or the like) displays (not shown), KVM connections, or the like.

The database 116 may comprise any memory and computer-readable storage media and may be used to store inventory 120 of items available for purchase. The database 116 may also store one or more user profiles 122 of the users 102.

The server 110 may comprise a website module 124, which may be stored on the memory 114 and configured to provide a website with viewable information to the computing devices 106 in a particular format and/or according to a particular protocol, such as HTTP, or in any other format capable of being consumed by the users 102 (e.g., capable of being read and/or displayed by the user computing devices 106 and rendered by the applications 108 of the respective users 102). The website module 124 may include a graphical user interface (GUI) to enable and facilitate selection and purchase of products and services. The GUI may be embodied in various formats, such as being compatible with conventional web browsers. The GUI may include various menus and options to allow a user to navigate through a variety of menu options and customized listing of products and services. As can be appreciated, the number of available products and services may be significant and providing a user-friendly interface greatly improves a reservation experience.

The website module 124 may enable a customized website, meaning that a website may include tailored web resource(s) provided to the users 102 according to a "context" (e.g., as embodied by a user context) of the respective user 102. The context of a user 102 may be developed from one or more interactions of the user 102 and/or information stored in a user profile 122. The user profile 122 may include a locale of the user 102, demographics of the user 102, search terms submitted by the user 102, items purchased by the user 102, content accessed by the user 102 on the website and/or affiliated websites, other personal information, and the like. In particular, accessed content may include a wide variety of media content including social media such as video, audio, literature, and the like. The user profile 122 may include a browsing history of user's preferences in social media which may be indicative a user's preferences in goods and services. The user profile 122 may also include physical and physiological traits of a user such as age, race, health conditions, and the like. Any data compiled in a user profile 122 may be referred to as a characteristic. A characteristic may be helpful in determining likely user preferences based on aggregated data for a class of users. For example, users 102 in a certain age group may exhibit statistically greater preferences for one type of entertainment over another.

A specific user profile 122 includes identification of the user 102 and may include contact information and a variety of demographic data. The user profile 122 may include a history of a user's travel reservations, including airline reservations, hotel and resort reservations, ticketed events, dining reservations, and the like. The user profile 122 may also include live time information on a user 102. For example, the live time information may include where the user 102 is presently checked into a hotel, the current rental car reservations, return air travel reservations, what dining reservations the user may hold for the current day, and what ticketed events the user may have in the next 48 hours. As can be appreciated, these are exemplary points of live time information and the full scope of such information is far broader.

The website module 124 may include a user identification module 126 to allow the website module 124 to identify incoming users 102 and may provide log-in capability for securely accessing a user account. Identifying users 102 across multiple sessions at a website and/or across multiple visits to affiliated websites (not shown) may allow the website to fully leverage the information embodied in the user profiles 122. For example, the user profiles 122 may include user interaction data occurring over different visits by a user 102 to the website. In addition, the user profiles 122 may include interaction data observed at other, affiliated websites (not shown). The user identification module 126 may allow the website to identify users 102 across multiple visits to the website and/or identify users 102 that have previously visited other websites affiliated with the server-hosted website.

The user identification module 126 may be configured to identify users 102 (e.g., obtain a user identifier associated with the respective users 102) via a plurality of different mechanisms. This may allow the user identification module 126 to reliably identify different users 102, who may employ different applications 106 (e.g., different user agent applications) having different configurations (e.g., proxy settings, security settings, etc.). The user identification module 126 may be configured to identify users 102 with little impact on the user experience at the website. As used herein, a user identifier and/or user identifying information may refer to a unique identifier value, which may enable distributed systems to uniquely identify a particular user and/or a particular user agent instance. In some embodiments, a user identifier may be globally unique (e.g., comprise sufficient data and/or randomness, as to be reasonably sure that no two (2) user identifiers will ever collide). Some user identifier values may comprise an authentication credential to allow the user identifier to be tied to a particular user, to a particular user agent application (e.g., web browser instance), a particular computing device, or the like. Such authentication credentials may include, but are not limited to: an Internet Protocol (IP) address, a media access control (MAC) value, a hardware identifier, a user name and password, a personal identification number, a digital signature, or the like.

Users 102 who visit the website may have and/or be assigned a user identifier, which may be a global unique identifier value (GUID). The user identifier (e.g., GUID) may allow the website and/or affiliate websites (not shown) to uniquely identify the user 102.

In one embodiment, the website 112 includes a shopping cart 128 which manages on-line user transactions. The shopping cart 128 may be configured to receive the item(s) to be purchased, apply any discount or coupon, and charge a user for the remaining amount owed.

The server 110 may comprise a merchandise engine 130, resident in memory 114, which determines the items that will be viewable in the website and available for purchase. The merchandise engine 130 may further determine how and in what rank or order items are displayed to a user. The merchandise engine 130 may include one or more rule tables 132 comprising rules 134 which are used to determine how items are to be displayed and listed. The rules 134 may be configurable, as there may be a weighting balance on what serves the user 102 and what is most profitable for different providers of items and/or the system provider. The merchandising engine 130 applies rules 134 from the various tables 132 which affects which items may be displayed, reserved, and purchased. A common rule is simply item availability. Preference may be given to items by listing certain events first, highlighting events, and the like.

The rules 134 may include one or more qualification rules 136 and sorting rules 138. Upon receiving a user request for an item, the merchandise engine 130 accesses qualification rules 136 to determine which items comply with the request and are eligible for listing. The qualification rules may 136 utilize one or more factors or parameters to determine item eligibility and availability. For example, items may be sold out and no longer available in the inventory 120. Factors and parameters may be generated by user input in providing a request for a list of items. For personally attended events, such as travel, user entered destinations and start and end dates will generate source qualifiers to filter items based on geography and availability. Thus, only events in a certain vicinity and with availability on the requested dates are eligible. A user 102 may also enter a price range, quality ranking, and/or amenities. In the example of a hotel, hotels may be filtered based on quality standards, guest reviews, physical location, pricing, pool, refrigerator, breakfast, and so forth.

The qualification rules 136 may also rely on factors and parameters specific to a user profile. A user profile 122 may indicate a brand preference, quality preference, hotel amenity preference, energy conservation preference, price range, and the like. For example, certain automobile models may not be listed because a user profile indicates a strong aversion to low gas mileage performance.

For air travel, the qualification rules 136 may determine eligibility based on one or more factors such as brand of airline carrier, use preferred air fare type (coach or first class), air location (origin city or destination city), customer rating, departure and return date availability, and pricing. For other travel events, the qualification rules 136 may determine item eligibility based on customer rating, event start and end dates, pricing, inventory source, package (whether the item is in a pre-bundled travel package), packaged item (whether the qualifying item is in a pre-bundled package with another specific bundled item), quality rating, type of venue, promotion, promotion booking start and end dates, purchase quantity, rate plan such as a regular rate or a non-refundable rate), search category (e.g. pet friendly), and the like.

Qualification rules 136 may also be used in combination with an unlimited amount of AND and OR statements. For example, a source qualifier could require that both the Product Hotel=MGM Grand qualifying rule AND Promotion Booking End Date>TODAY+14 qualifying rule. Lists of items for qualification consideration may be catalog sourced or promotion sourced. A catalog sourced list is one where any qualifying item would qualify for display. A promotion sourced list is one where any qualifying item with a qualifying promotion would qualify for display. In order to list an item or an item-promotion pairing there must be available inventory and the item must meet the qualification rules 136.

Once the items are filtered based on eligibility, the merchandise engine 130 configures the webpage to list products or services in an order based on sorting rules 138. The sorting rules 138 may allow for the items to be listed randomly, alphabetically, by a revenue metric, by lowest price, or sequentially based on a user 102 manually choosing the order. A revenue metric may include, but is not limited to, gross revenue per impression, net revenue per impression, tax revenue per impression, or total gross or net revenue over a historic period. The revenue metric may be specific to the system provider or to the item provider. The term "generated revenue" may be defined as one of the listed revenue metrics or even a combination of the revenue metrics.

It is advantageous to rank items based on the likelihood of user 102 selection and purchase. In one embodiment, the merchandise engine 130 compiles a list of items and ranks the items based on revenue generated per impression. An impression occurs when an item is viewed, in a list or otherwise, by a user 102 on the website. Revenue is generated when a user conducts a transaction and completes a purchase. As discussed above, the revenue may be based on gross revenue, net revenue, tax revenue, or total gross or net revenue over a historic period. The generated revenue per impression model is an indication of which items are selling to the users 102. Items that have been shown so many times and generated a certain amount of revenue may be ranked with an expectation that these items will continue to sell in a similar manner. With popular items, there is a factor that is driving the market appeal which may include price, quality rating, product image on the website, recommendation percentage, and the like. Indeed, there could be any one or combination of factors that represent perceived value to the user 102. The merchandise engine 130 does not attempt to determine which factor is instrumental in driving transactions for popular items. Rather, the merchandise engine 130 provides preferential listing of popular items.

A user 102 may select an item to view additional information and/or place the item into a shopping cart, but revenue is only realized when the purchase is complete. A user 102 may make a reservation to use an item such as a car rental or hotel stay. The merchandise engine 130 may determine a reservation equates to generated revenue or may determine that a pre-purchase or waiting until the actual purchase is required to realize revenue. Ultimately, as an item proves to be more popular, it will generate more revenue, and then the item will be displayed more often based on the sorting rules 138.

The merchandise engine 130 monitors impressions and generated revenue for each item and may maintain an item list based on revenue per impression. The list may be continually updated as generated revenue per impression data changes for items. The sorting rules 138 provide that the viewed items that generate the most revenue will have preferential ranking in a list. Thus, the most revenue generating item is listed first and other items are listed in descending order based on revenue generation. The merchandise engine 130 may also be configured to distinguish between gross and net revenue generated for each item. A generated list may be limited to a certain number of items, such as 10, 20, 50, or 100, so items generating relatively little revenue in comparison may be eliminated entirely from the list. This result is that preferred items are displayed in a preferentially listing which increases user satisfaction and increases profitability for providers of the system 100.

In one embodiment, the items may include products or services that correspond to a particular date or range of dates. A date may include a future day, future days, and/or time of day. Thus, a user 102 may intend to purchase a product to be picked up on a certain day or attend an event on one or more days. The business rules may list items based on revenue per impression and based on a future date. A user 102 may request an item on a specified date and the merchandising engine determines the item revenues per impression for that date. As mentioned previously, the merchandising engine may also determine if the items are available on the requested date based on qualification rules. The items are then listed based on a ranking of revenues per impression with respect to the requested date. In this manner, the merchandising engine ensures preferential listing of the items that are likely to deliver the most revenue.

With the application of a date-based rule, the likelihood of listing better qualified and more profitable items for that date is increased. Items that sell better for that date will rise in the rankings. The generated lists will vary with the requested dates. Items will vary in popularity depending on the requested dates. For example, certain hotels may be preferred on certain dates based on proximity to date-specific events. As products and services are displayed to users 102, the reliance on revenues per impression is improved as the system 100 filters out the underperforming items.

In one example, a user 102 may request an event for an upcoming travel date, such as a hotel stay. The user 102 enters a requested date for check-in and enters a desired location. The merchandise engine 130 confirms the hotel revenues generated per impression for the requested date. The displayed hotels are then listed in order of generated revenue for the requested date. As previously mentioned, the generated revenue may be net, gross, or based on other factors to indicate profitability. In relation to travel, the system 100 has particular applicability because of the nature of the expiring travel inventory. The system 100 preferentially displays the more popular hotels which is appreciated by the users.

As the merchandise engine 130 is concerned, the listed items may have no business relationship with one another. Thus, ranks may be determined by profitability as measured by generated revenue per impression.

Although the disclosure contemplates a date-based, revenue generation rule, one of skill in the art will appreciate that other rules may be applied. For example, regardless of the date and/or revenue generation, items may be listed based on a best selling criterion, popularity, number of hits on the webpage, and the like.

In one embodiment, the merchandise engine 130 includes a reservation rule 140 to reserve one or more slots for inclusion of an item that would otherwise qualify. This item may be selected regardless of generated revenue per impression. Eligible items for the reserved slot may be randomly selected or selected based on turns. Item eligibility may be based on a number of factors such as a number of factors similar to other items with priority ranking. This allows an item to have an opportunity to increase its ranking because if may be selected as it is displayed in the reserved slot.

For example, a slot on a first displayed webpage may be reserved for hotels in a selected geographical market. A user 102 may request a hotel in Las Vegas, for a certain date, and the more popular hotels, based on revenue per impression populate the list. However, a hotel in the Las Vegas market may be selected, regardless of rank, and be listed in the reserved slot. The hotel selected for the reserved slot may be otherwise qualified in that it is available for the requested date and it meets desired standards. This allows for participating hotels an opportunity to be listed regardless of rank based on revenue per impression.

The use of a reserved slot allows an opportunity for items to be listed without hindering the revenue model of the system 100. By way of example, a reserved slot may be the fourth in a ranking, and the first three slots may continue to show items with the highest profitability. Accordingly, adequate space is maintained for popular items to continue the revenue generation.

The merchandise engine 130 may be configured to provide a cross-sale list which is a list that is displayed to user 102 to entice a user 102 to purchase additional items of interest. Various triggers may be defined for when a cross-sale list is generated. In one embodiment, a cross-sale list may be generated after a user 102 indicates a preference for an item, such as by entering the item in the shopping cart 128. In one example, a user 102 may add a hotel stay at the MGM Grand into the shopping cart. In response, a cross-sale list of other items at the MGM Grand or in the vicinity may be displayed such as shows, restaurants, and merchandise. The item added to the shopping cart 128 may be subsequently deleted or saved for purchase at a later time. Listed items may be based on one or more items entered into the shopping cart or items previously purchased. Thus, the listed items may be those commonly purchased by users 102 purchasing an item in the shopping cart 128. Listed items may also be entered based on a user profile 122.

Figure 2:
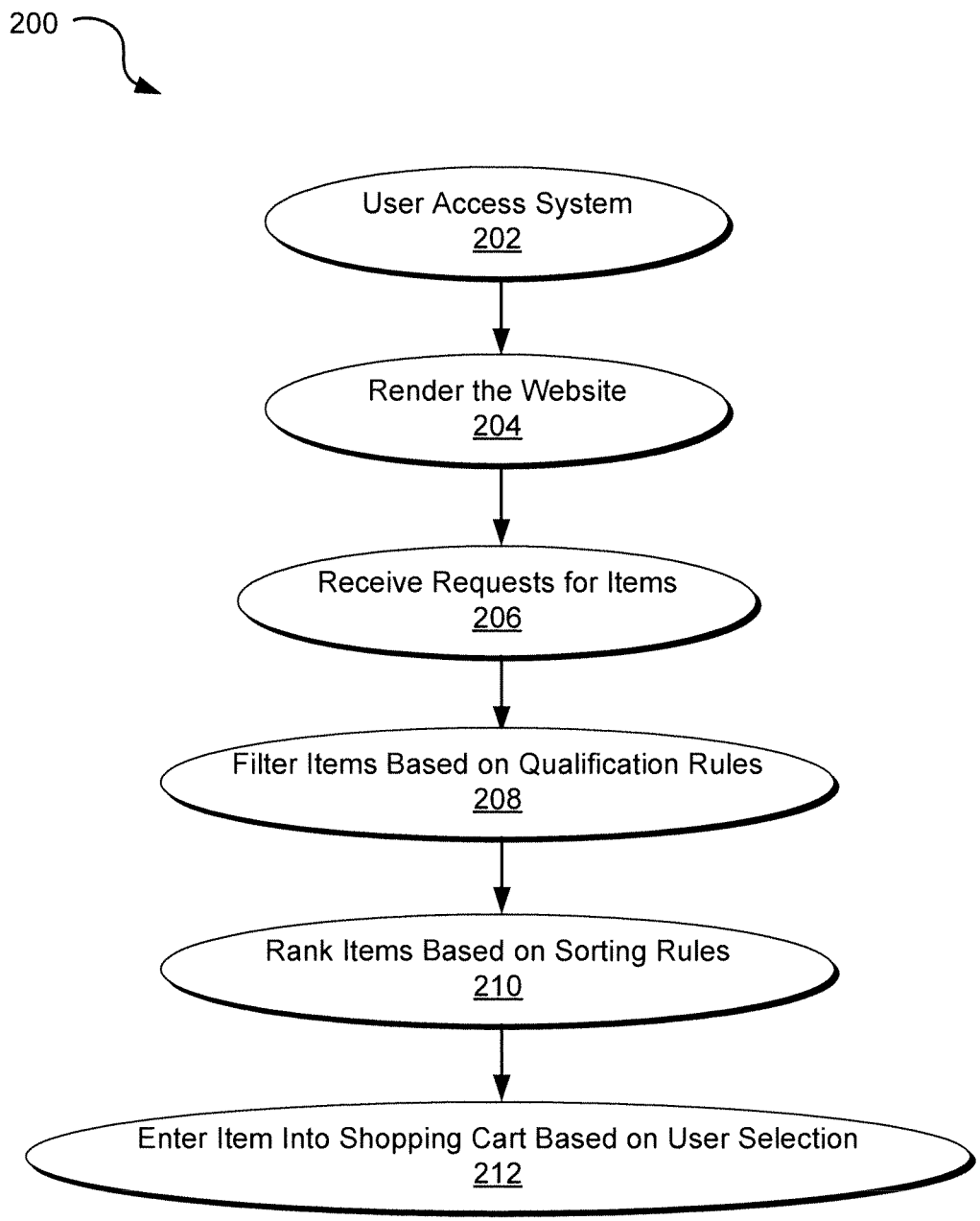
FIG. 2 is a flow diagram of one embodiment of a method for providing and displaying items for purchase.

Referring to FIG. 2, a flow diagram illustrating a method 200 performed by the system 100 of the present disclosure is shown. Certain steps may be performed in whole or in part by the website module 124, merchandise engine 130, or other modules of the system 100. A user 102 accesses 202 the system 100 over a network 104 to view and purchase items. A user accessing the system may do so on the user's behalf or on behalf of a customer. In response, the website module 124 and application 108 render 204 the website and may prompt for a login or other customer identification. The website module 124 may be configured to establish customer accounts with user names and passwords. Each customer account may be associated with a user profile 122 stored in the database 116. Thus, when logging in, the system 100 is able to retrieve a user profile 122. Furthermore, additional user account information may be stored in the database 116, such as billing information, correspondence and contact information, and the like. As such information is highly confidential, the necessary encryption may be employed for security.

The system 100 then receives 206 a request to view items available for purchase. The request may take any number of forms of user-entered inputs such as search request for popular video games, live performance requests, hotel itinerary requests, and the like. As discussed above, the requested item may be a date-specific event. In another example, a user 102 may enter a video game title or simply enter a request for popular video game titles. The request may be more specific to video games for a certain age group.

The merchandise engine 130 filters 208 relevant items in the inventory 120 based on one or more qualification rules 136. The merchandise engine 130 may apply qualification rules 136 based on one or more characteristics in the user profile 122. For example, the user demographics, purchase history, and browsing history may all impact which qualification rules 136 may be applied The merchandise engine 130 then ranks items 210 for display to a user based on one or more sorting rules 138. The ranking may be based on generated revenue per impression for an item. This may further include generated revenue per impression based on a date specific to the item. In this manner, profitability may be maintained while serving the interests of the user 102. In response to user selection, an item is entered 212 into a shopping cart where a transaction may be completed.

Figure 3:
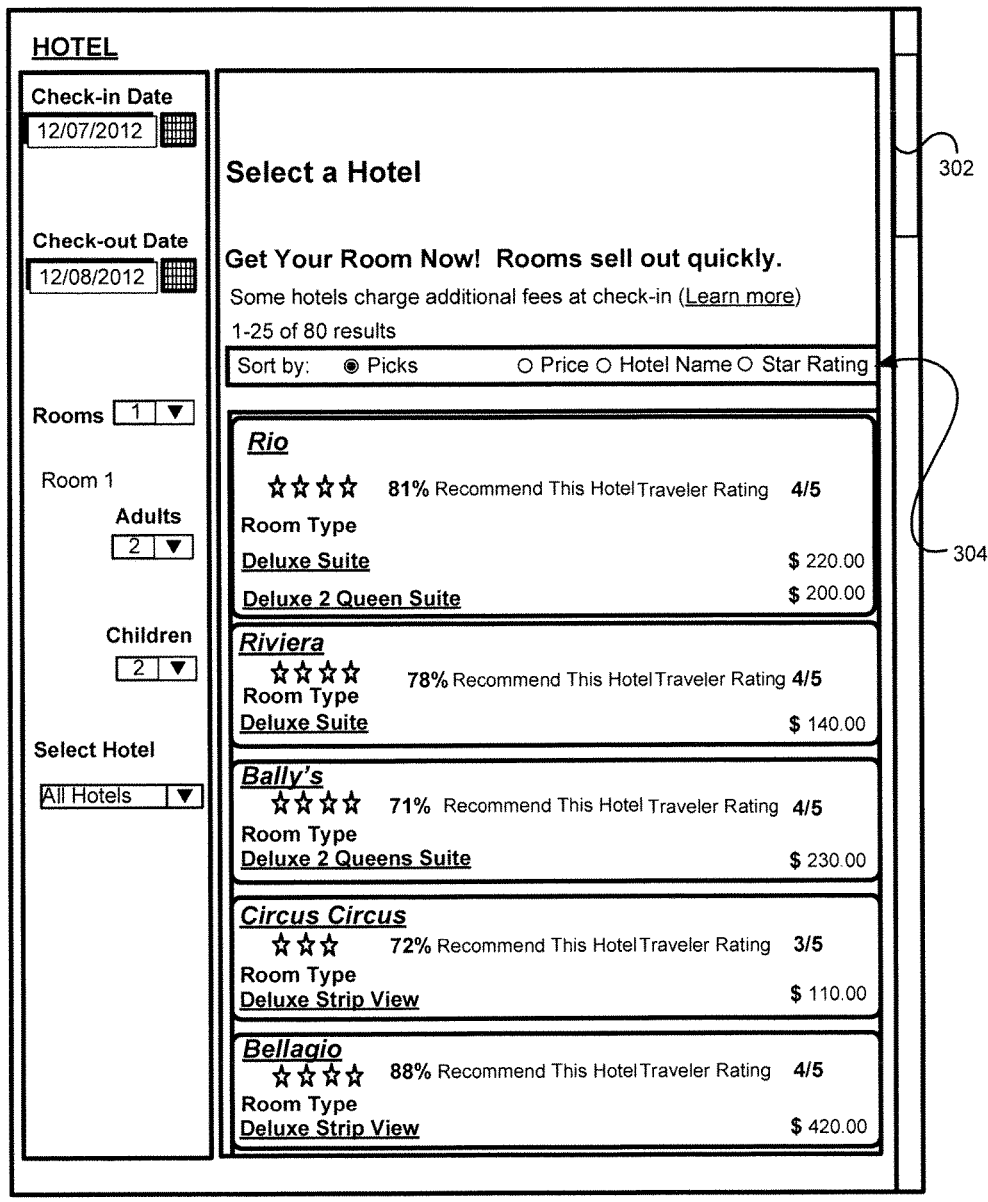
FIG. 3 is one embodiment of a webpage displaying a ranked list of hotel stays for purchase in response to a requested date.

Referring to FIG. 3, an example of a webpage is shown with a ranked list of hotels available in the Las Vegas market for a check-in of Dec. 7, 2012. One of skill in the art will appreciate that the displayed format may vary based on system design preferences. Additional hotels may also be included in the list as suggested by the scroll bar 302 on the right hand side. The listed hotel items have been deemed eligible based on one or more qualification rules 136. The hotel items are then listed according to a sorting rule 138 which ranks the items based on generated revenue per impression specific to the requested check-in date of Dec. 7, 2012. A check-in date of December 8th may vary the list based on user preferences as reflected in generated revenue per impression. The generated revenue may also be anticipated revenue as the user 102 may reserve a room, but not actually pay for the room until visiting the hotel.

Each hotel item may be displayed with the hotel name, star rating, available rooms, recommendation percentage, traveler rating, and the corresponding room price. Although not shown, a picture of the hotel and/or brand logo may also be shown. As can be appreciated, hotel items may be displayed in a variety of formats based on design preferences. Indeed, the appeal of a hotel picture may influence the popularity of the hotel and its selection.

The user 102 may be unaware of the ranking of the hotel items based on generated revenue. However, in one embodiment, the user 102 may alter the list by selecting an option 304 to rank the hotel items base on price, star rating, alphabetical based on hotel name, customer rating, proximity and the like.

In one embodiment, a reservation rule 140 is applied to reserve a slot, such as the fourth slot, for an eligible item regardless of generated revenue per impressions for the desired date. In the given example, Circus Circus is selected to be in the reserved, fourth slot. This provides an opportunity for eligible hotels to participate while maintaining the generated revenue model.

Referring to FIG. 4, an embodiment of a webpage is shown displaying a ranked list of video games for purchase in response to a user request. The user request may include a video game title search, a request for popular video games, a request for video games in a certain genre, and the like. The user request for a video game item is not likely to be specific to a date. As such, the rankings in the list are based on generated revenue per impressions without a specific date. Clicking on a video game item generates an impression, while completing a transaction for a video game generates revenue.

Referring to FIG. 5, an embodiment of a webpage displaying a ranked list of toy products for purchase in response to a user request. As with the video game list of FIG. 4, the toy products are not likely to correspond to a specific date. Thus, the ranking is based on generated revenue per impressions. The user request may be for a list of popular toys in a certain age group for a certain gender.

FIG. 6 is one embodiment of a webpage displaying a ranked list of live shows for purchase on a requested date. As with the hotel list of FIG. 4, the user has entered a specific date and the live show options are ranked according to generated revenue per impressions for the requested date.

It will be understood by those having skill in the art that many changes may be made to the details of the above-described embodiments without departing from the underlying principles of this disclosure.

What is claimed is:

1. A non-transitory computer-readable medium comprising instructions to cause a computing device to perform a method of providing a list of items for purchase on a website for the sale of the items, the method comprising:
   determining a generated revenue per impression for each of a plurality of items displayed by a web service by:
      monitoring impressions for each of the plurality of items, wherein an impression comprises a user clicking on one of the plurality of items; and
      associating transactions with respective impressions;
   transmitting, by a web server, a markup for a web service for purchasing items;
   receiving, by the web server, a user request regarding an item for purchase;
   in response to the receiving of the user request, forming a set of eligible items by filtering items, by a merchandise engine, based on a set of qualification rules to determine eligibility, wherein the qualification rules comprise a first subset of qualification rules that includes pre-determined parameters, and a second subset of qualification rules that includes user parameters;
   generating a display list defining which items will be viewable at a user system, by the merchandise engine, wherein generating the display list comprises:
      obtaining the generated revenue per impressions for the eligible items;
      applying a reservation rule to select an unqualified item that meets the first subset of the qualification rules but not the second subset of the qualification rules;
      ordering, by the merchandise engine, the eligible items and the unqualified item to form the display list, wherein the eligible items are arranged from most generated revenue per impressions to least generated revenue per impressions, and the unqualified item is slotted in a reserved slot having a ranking in the display list,
      wherein the unqualified item is slotted in the reserved slot and satisfies: at least one item within the list that is both (1) out of order based on the ranking from most generated revenue per impressions to least generated revenue per impressions and (2) eligible based on the first subset but not based on the second subset of qualification rules;
   customizing, by the web server, the markup to include web resources associated with each of the items on the display list arranged according to an order of the display list;
   transmitting, by the web server, the customized markup to the user system; and
   upon receiving a user selection of a selected item on the display list, entering the selected item into a shopping cart on the website.

2. The computer-readable medium of claim 1, wherein the user request includes a date and wherein determining generated revenue per impressions for the eligible items is based on the date.

3. The computer-readable medium of claim 2, wherein the eligible items are events for personal user attendance.

4. The computer-readable medium of claim 1, wherein the first subset of the qualification rules includes a determination of item availability.

5. The computer-readable medium of claim 1, wherein the second subset of the qualification rules is based on one or more characteristics in a user profile corresponding to the user.

6. The computer-readable medium of claim 1, wherein the method further comprises altering a ranking of the list in accordance with a user entered preference.

7. The computer-readable medium of claim 1, wherein the eligible items are tangible goods.

8. The computer-readable medium of claim 1, wherein the method further comprises generating a cross-sale list of items in response to user interest in one or more eligible items.

9. A non-transitory computer-readable medium comprising instructions to cause a computing device to perform a method of providing a list of items for purchase on a website for the sale of the items, the method comprising:
   determining a generated revenue per impression for each of a plurality of items displayed by a web service by:
      monitoring impressions for each of the plurality of items, wherein an impression comprises a user clicking on one of the plurality of items; and
      associating transactions with respective impressions;
   transmitting, by a web server, a markup for a web service for purchasing items;
   receiving, by the web server, a user request regarding an item for purchase displayed as part of the web service;
   in response to the receiving of the user request, forming a set of eligible items by filtering items, by a merchandise engine, based on a set of qualification rules to determine eligibility, wherein the qualification rules comprise a first subset of qualification rules that includes pre-determined parameters, and a second subset of qualification rules that includes user parameters;
   sorting the set of eligible items, by the merchandise engine, based on generated revenue per impressions from most generated revenue per impressions to least generated revenue per impressions;
   generating a display list defining which items will be viewable at the user system, the display list comprising a number of ranked slots and a reserve slot, wherein the ranked slots are filled using the sorted eligible items, the reserve slot filled by
an item that is ineligible based on the second set of qualification rules into the reserved slot that is out of order with respect to revenue per impression;
customizing, by the web server, the markup to include web resources associated with each of the items on the display list arranged according to an order of the display list,
transmitting, by the web server, the customized markup to the user system; and
upon selection of an item on the display list, entering the item into a shopping cart on the website.

10. A computer system to perform a method of providing a list of items for purchase on a website for the sale of the items, the system comprising:
a processor;
a computer-readable non-transitory medium in electrical communication with the processor and comprising computer executable instructions configured to cause the computer system to:
determine a generated revenue per impression for each of a plurality of items displayed by the website by:
monitoring impressions for each of the plurality of items, wherein an impression comprises a user clicking on one of the plurality of items; and
associating transactions with respective impressions;
receive, through a web server via a network interface, a user request from the user system regarding an item for purchase displayed as part of the website;
filter a plurality of items based at least in part on the user request for the item and based on a set of qualification rules to determine eligibility for each of the plurality of items to form a set of eligible items, wherein the qualification rules comprise a first subset of qualification rules that includes pre-determined parameters, and a second subset of qualification rules that includes user parameters for the scope of qualification of items;
generate a set of display items based at least in part on the set of eligible items, a sorting rule and a reservation rule, wherein to generate the set of display items, the computer executable instructions are configured to cause the computer system to:
obtain generated revenue per impressions for each of the plurality of eligible items;
apply a sorting rule to rank the eligible items based on generated revenue per impressions and generate a display list of the eligible items that is ordered based on the ranking from most generated revenue per impressions to least generated revenue per impressions, the display list defining which items will be viewable at the user system;
apply a reservation rule to reserve at least one slot in the display list for an out of order item and insert an item that is ineligible based on the qualification rule into the at least one slot that is out of order with respect to the ranking of generated revenue per impressions;
format, by the web server, a markup of the website to include web resources associated with each of the items on the display list arranged according to an order of the display list; and
upon receiving a user selection of an item on the display list, enter the item into a shopping cart system.

11. The computer system of claim 10, wherein the user request includes a date and to determining generated revenue per impressions for the eligible items is based on the date.

12. The computer system of claim 11, wherein the eligible items are events for personal user attendance.

13. The computer system of claim 10, wherein the first subset of qualification rules includes a determination of item availability.

14. The computer system of claim 10, wherein the second subset of qualification rules is based on one or more characteristics in a user profile corresponding to the user.

15. The computer system of claim 10, wherein the computer executable instructions are further configured to reserve a slot in the list and insert an eligible item into the slot regardless of the ranking of generated revenue per impressions.

16. The computer system of claim 10, wherein the computer executable instructions are further configured to alter the order of the display list in accordance with a user entered preference.

17. The computer system of claim 10, wherein the eligible items are tangible goods.

18. The computer system of claim 10, wherein the computer executable instructions are further configured to generate a cross-sale list of items in response to user interest in one or more eligible items.

* * * * *